United States Patent
Kume et al.

(10) Patent No.: US 9,303,728 B2
(45) Date of Patent: Apr. 5, 2016

(54) ROTARY ACTUATOR

(71) Applicant: DENSO CORPORATION, Kariya, Aichi-pref. (JP)

(72) Inventors: Mikine Kume, Chiryu (JP); Seiji Nakayama, Obu (JP); Taku Itoh, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/767,177

(22) Filed: Feb. 14, 2013

(65) Prior Publication Data

US 2013/0217531 A1 Aug. 22, 2013

(30) Foreign Application Priority Data

Feb. 17, 2012 (JP) .................................. 2012-32431

(51) Int. Cl.
| | |
|---|---|
| F16H 1/32 | (2006.01) |
| F16H 57/023 | (2012.01) |
| H02K 7/116 | (2006.01) |
| H02K 5/04 | (2006.01) |
| F16H 57/02 | (2012.01) |
| F16H 55/17 | (2006.01) |
| F16H 1/28 | (2006.01) |

(52) U.S. Cl.
CPC ................ F16H 1/32 (2013.01); F16H 57/023 (2013.01); H02K 5/04 (2013.01); H02K 7/116 (2013.01); *F16H 1/2818* (2013.01); *F16H 2055/176* (2013.01); *F16H 2057/02034* (2013.01)

(58) Field of Classification Search
CPC ................ H02K 7/16; F16H 2055/176; F16H 2001/327
See application file for complete search history.

(56) References Cited

U.S. PATENT DOCUMENTS

2007/0202981 A1* 8/2007 Sugiura .................. F01L 1/022
  475/162
2009/0189468 A1 7/2009 Kume et al.

FOREIGN PATENT DOCUMENTS

| JP | 63-170640 | 11/1988 |
|---|---|---|
| JP | 2003-189553 | 7/2003 |
| JP | 2005-061582 | 3/2005 |
| JP | 2005-265151 | 9/2005 |
| JP | 2010-193653 | 9/2010 |

OTHER PUBLICATIONS

Machine Translation for JP2010-193633 (Oishi).*
Office Action (1 page) dated Jan. 24, 2014 issued in corresponding Japanese Application No. 2012-032431 and English translation (2 pages).
Office Action issued in corresponding Chinese Application No. 2015022500927910 dated Feb. 28, 2015 (with partial translation).

* cited by examiner

Primary Examiner — Robert Hodge
Assistant Examiner — Ryan Dodd
(74) Attorney, Agent, or Firm — Nixon & Vanderhye P.C.

(57) ABSTRACT

A rotary actuator includes a rotation shaft rotatably driven by a motor, an internal gear provided on an outer side of the rotation shaft in a radial direction of the rotation shaft, a rotation output section provided between the rotation shaft and the internal gear in the radial direction to reduce a rotation speed outputted from the rotation shaft and to output a power in conjunction with the internal gear, a cylindrical housing portion fixed to the internal gear, and an attachment member integrated with an outer wall of the housing portion. The internal gear has a protrusion protruding from an outer wall of the internal gear, and the housing portion has a recess into which the protrusion is inserted. The attachment member has an attachment hole that is different from the recess in position in a circumferential direction of the housing portion.

6 Claims, 6 Drawing Sheets

ROTARY ACTUATOR

CROSS REFERENCE TO RELATED APPLICATION

This application is based on and incorporates herein by reference Japanese Patent Application No. 2012-032431 filed on Feb. 17, 2012.

TECHNICAL FIELD

The present disclosure relates to a rotary actuator.

BACKGROUND

Conventionally, a rotary actuator used in, for example, a drive portion of a shift-by-wire system is known. A rotary actuator disclosed in Patent Document 1 (Japanese Patent No. 4560743 corresponding to US 2009/0189468) includes a speed reduction portion having an internal gear and an external gear. The internal gear is press-fitted to an inner wall of an annular plate provided in a resin housing. Protrusions provided integrally with an outer wall of the internal gear are inserted into recesses of an inner wall of the housing. The housing has an attachment holes located at positions same as positions of the recesses in a circumferential direction of the housing.

In the rotary actuator disclosed in Patent Document 1, the recesses and the attachment holes both of which can cause stress concentration are same as each other in position in the circumferential direction. Thus, stress applied on the housing in the press-fitting of the internal gear concentrates on parts of the housing where the recesses and the attachment holes are located. Therefore, cracking may be generated at the parts of the housing where the recesses and the attachment holes are located. Moreover, if the cracking further extends, the housing may be broken.

SUMMARY

An objective of the present disclosure is to provide a rotary actuator capable of restricting breakage of a housing thereof.

According to an aspect of the present disclosure, a rotary actuator includes a motor, a rotation shaft, a rotation output section, a housing portion, and an attachment member. The rotation shaft is rotatably driven by the motor. The internal gear incapable of rotating is provided on an outer side of the rotation shaft in a radial direction of the rotation shaft. The rotation output section is provided between the rotation shaft and the internal gear in the radial direction to reduce a rotation speed outputted from the rotation shaft and to output a power in conjunction with the internal gear. The housing portion has a cylindrical shape, and is fixed to the internal gear located on an inner side of the housing portion in the radial direction. The attachment member is integrated with an outer wall of the housing portion. The internal gear has a protrusion protruding from an outer wall of the internal gear, and the housing portion has a recess into which the protrusion is inserted. The attachment member has an attachment hole that is different from the recess in position in a circumferential direction of the housing portion.

The recess and the attachment hole, both of which can cause stress concentration, are separated from each other in the circumferential direction. Hence, a stress applied on the housing portion in the fixation of the internal gear to the housing portion can be dispersed in the circumferential direction without focusing on a local part of the housing portion. As a result, cracking of the housing portion due to stress concentration can be restricted, and breakage of the housing portion can be limited. The housing portion can be made to be robust.

The rotation output section may include an eccentric shaft, an external gear and an output member. The eccentric shaft may be provided eccentrically with respect to a rotation axis of the rotation shaft, and may rotate integrally with the rotation shaft. The external gear may be supported rotatably by the eccentric shaft, and the external gear engages with the internal gear. The external gear may revolve around the rotation axis of the rotation shaft with rotating on a rotation axis of the eccentric shaft when the rotation shaft rotates. The output member may be arranged coaxially with the rotation shaft such that the rotation of the external gear is transmitted to the output member.

Alternatively, the rotation output section may include a sun gear, a planetary gear and a planetary carrier. The sun gear may rotate integrally with the rotation shaft, and the planetary gear engages with the internal gear and the sun gear. The planetary gear may revolve around a rotation axis of the rotation shaft with rotating when the rotation shaft rotates. The planetary carrier may be arranged coaxially with the rotation shaft, and the planetary carrier may support the planetary gear rotatably such that the revolution of the planetary gear is transmitted to the planetary carrier.

The rotary actuator may include a metallic collar fixed to an inner wall of the attachment hole.

The attachment hole may be provided at three positions of the housing portion and may be arranged at regular intervals in the circumferential direction.

The internal gear may have a plurality of protrusions protruding from the outer wall of the internal gear, and the housing portion may have a plurality of recesses into which the plurality of protrusions are inserted respectively. The attachment holes may be different from the plurality of recesses in position in the circumferential direction of the housing portion.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A rotary actuator 10 of a first embodiment according to the present disclosure will be described in reference to FIGS. 1 to 5. The rotary actuator 10 is used for a drive portion of a shift-by-wire system for example. The rotary actuator 10 includes a housing 20, a motor 40, a speed reduction portion 60, an output member 70 and a rotary encoder 77.

Figure 1:
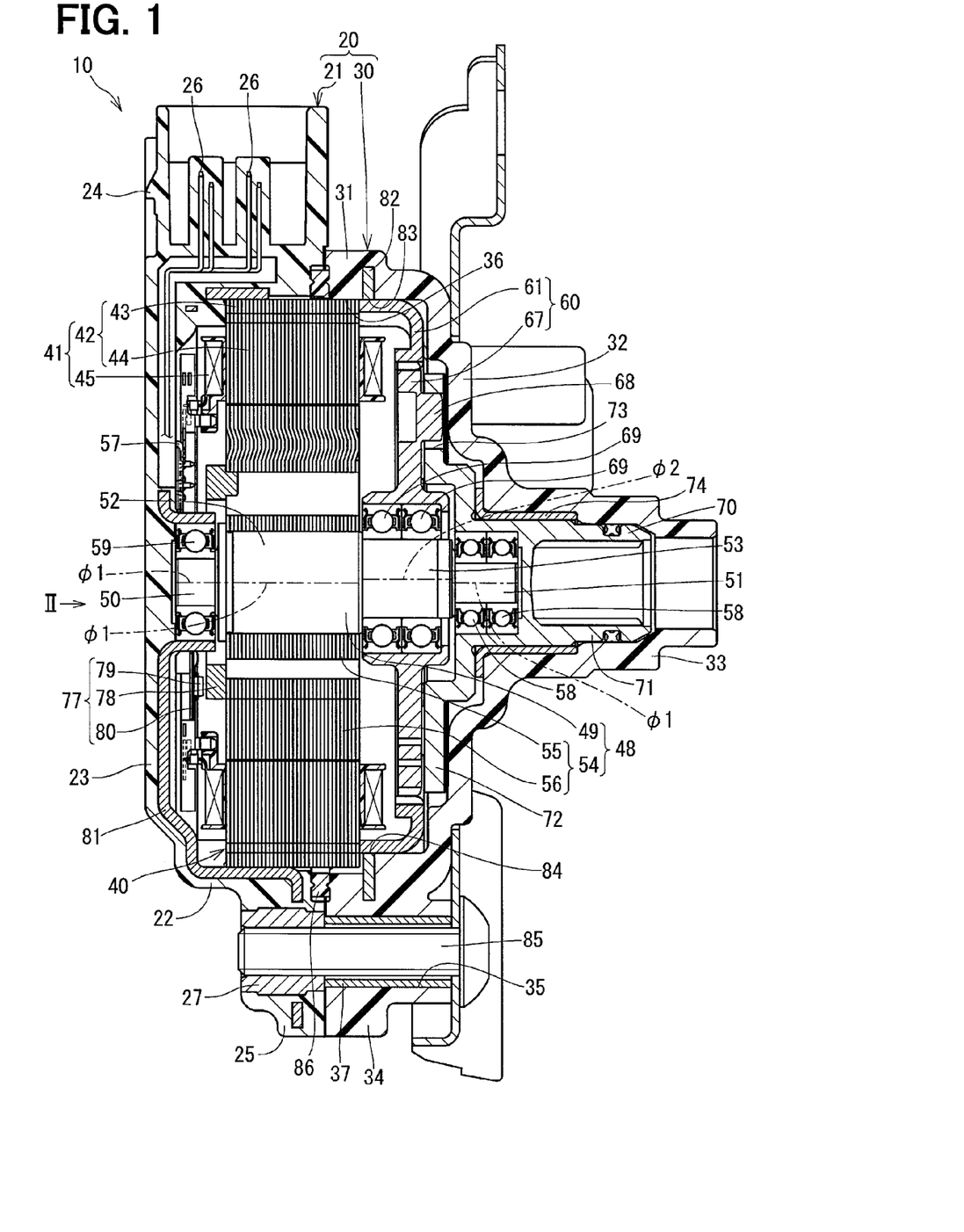
FIG. 1 is a sectional view showing a rotary actuator according to a first embodiment of the present disclosure.

The housing 20 includes a rear housing 21 and a front housing 30. The rear housing 21 is made of resin, and the rear housing 21 includes a cylindrical portion 22, a bottom portion 23, a connector portion 24 and three attachment portions 25. The cylindrical portion 22 and the bottom portion 23 hold a metallic plate 81 having a bottomed cylindrical shape, so that the plate 81 extends into the cylindrical portion 22 and the bottom portion 23 as shown in FIG. 1. The connector portion 24 holds therein a signal pin 26 for the rotary encoder 77, and a non-shown power pin for the motor 40. The attachment portions 25 are integrated with an outer wall of the cylindrical portion 22. Each of the attachment portions 25 holds therein an insertion nut 27 made of metal.

The front housing 30 is made of resin, and the front housing 30 includes a cylindrical portion 31, a bottom portion 32, an output portion 33 and three attachment portions 34. The cylindrical portion 31 is arranged coaxially with the cylindrical portion 22 of the rear housing 21, and the cylindrical portion 31 holds therein a metallic plate 82 such that the metallic plate 82 extends into the cylindrical portion 31. The bottom portion 32 closes an end portion of the cylindrical portion 31 on its opposite side from the rear housing 21. The output portion 33 has a cylindrical shape, and protrudes from a center portion of the bottom portion 32 in an opposite direction from where the rear housing 21 is. The output portion 33 can be inserted into a casing of a non-shown automatic transmission.

Figure 2:
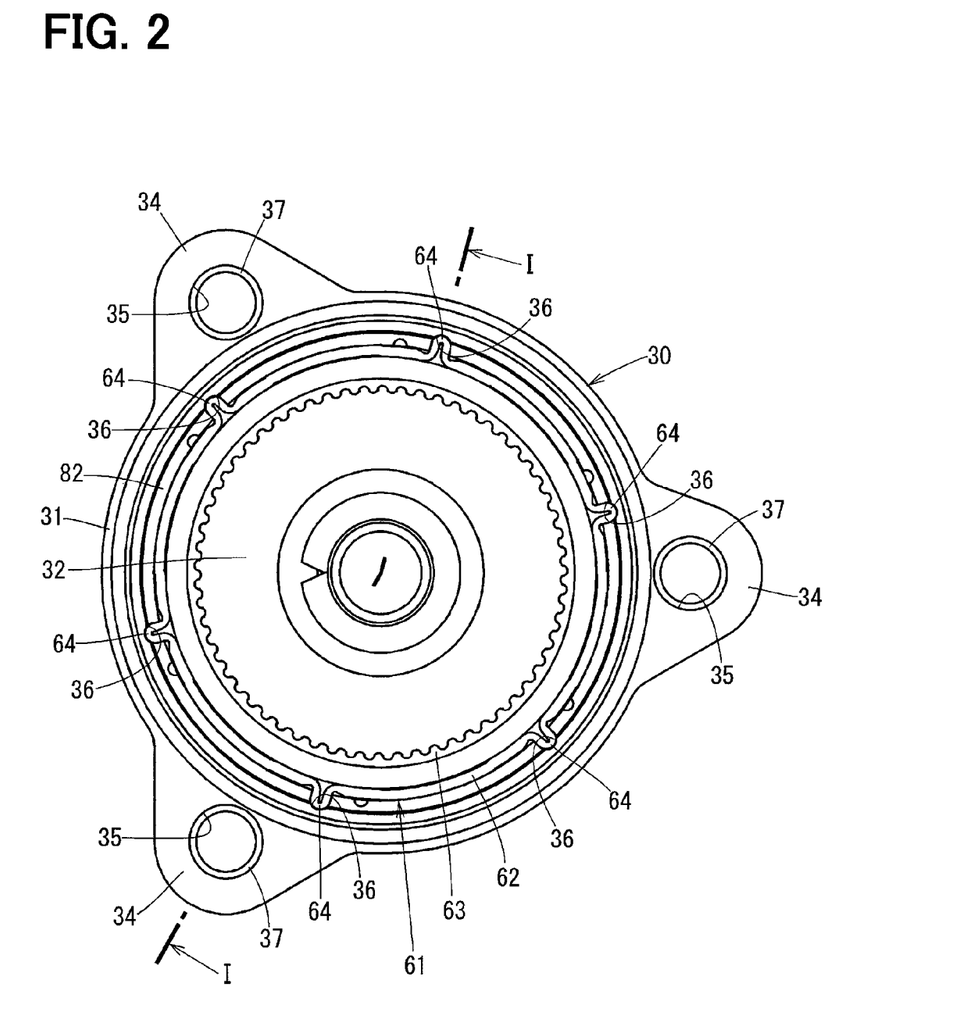
FIG. 2 is a view showing a front housing and a ring gear of the rotary actuator viewed from an arrow II in FIG. 1.
Figure 3:
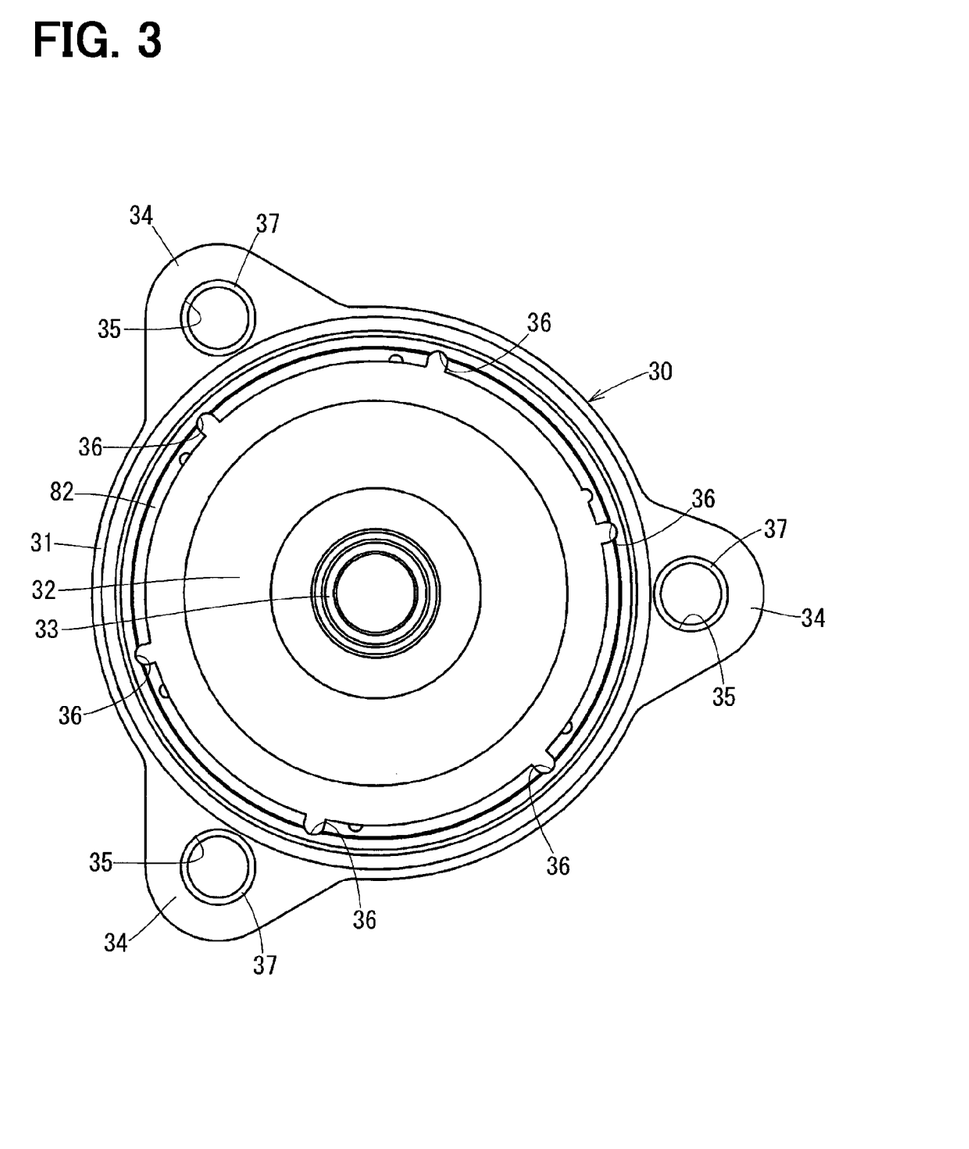
FIG. 3 is a view showing the front housing shown in FIG. 2.

The attachment portions 34 are arranged respectively at positions corresponding to the attachment portions 25, and are integrated with an outer wall of the cylindrical portion 31. Each of the attachment portions 34 has an attachment hole 35 that extends through the attachment portion 34 in an axial direction of the cylindrical portion 31. The attachment holes 35 are located at regular intervals in a circumferential direction of the cylindrical portion 31 as shown in FIGS. 2 and 3. Additionally, as shown in FIGS. 2 and 3, a part of an inner wall of the attachment hole 35 on a most inner side in a radial direction of the cylindrical portion 31 is located on an inner side of an outer surface of the cylindrical portion 31 in the radial direction of the cylindrical portion 31. An insertion collar 37 made of metal is fixed to the inner wall of the attachment hole 35.

The front housing 30 is fixed to the rear housing 21 by using a screw 85. The screw 85 is inserted through the insertion collar 37 to be fixed to the insertion nut 27. An inside of the housing 20 is sealed off from outside by a sealing member 86 provided between an opening end surface of the front housing 30 and an opening end surface of the rear housing 21.

The motor 40 is a three-phase brushless motor, and includes a stator 41 and a rotor 48. The stator 41 includes a stator core 42 and multiple coils 45. The stator core 42 includes a ring portion 43 fixed to a radially inner wall of the plate 81, and multiple teeth portions 44 protruding from the ring portion 43 radially inward. The teeth portions 44 are provided at regular intervals in a circumferential direction of the ring portion 43, and the number of the teeth portions 44 is twelve for example. In the stator core 42, multiple annular plates are stacked in their thickness direction.

The coils 45 include four U-phase coils, four V-phase coils and four W-phase coils, and these coils are made of conductive wires wound around the teeth portions 44. These three kinds of coils are arranged in the circumferential direction of the ring portion 43 in an order: the U-phase coil, the V-phase coil and the W-phase coil, such that two of the same kind of coils are not adjacent to each other.

The coils 45 are electrically connected to a bus bar 57 provided on an inner wall of the bottom portion 23 of the rear housing 21. The bus bar 57 includes a metallic thin plate, and is electrically connected to the power pin for the motor 40. The stator 41 generates a magnetic field revolving in a circumferential direction of the stator 41 by switching an energization of the U-phase coils, the V-phase coils and the W-phase coils. The generated magnetic field causes the rotor 48 to rotate.

The rotor 48 is located on a radially inner side of the stator 41, and the rotor 48 includes a rotor shaft 49 and a rotor core 54. The rotor shaft 49 includes a one end portion 50 on its one side in its axial direction, and the one end portion 50 is rotatably supported by a rear bearing 59. The rotor shaft 49 further includes an other end portion 51 on the other side in its axial direction, and the other end portion 51 is rotatably supported by a front bearing 58. The one end portion 50 of the rotor shaft 49 is located in the rear housing 21, and the other end portion 51 of the rotor shaft 49 is located in the front housing 30.

The rotor shaft 49 further includes a core fixation portion 52 and an eccentric portion 53 between the one end portion 50 and the other end portion 51. The core fixation portion 52 is adjacent to the one end portion 50, and the eccentric portion 53 is adjacent to the other end portion 51. The one end portion 50, the core fixation portion 52 and the other end portion 51 are arranged coaxially with each other on a first shaft center $\phi 1$ as shown in FIG. 1. The eccentric portion 53 is arranged on a second shaft center $\phi 2$ that is displaced from the first shaft center $\phi 1$. The one end portion 50, the core fixation portion 52 and the other end portion 51 may be used as an example of a rotation shaft driven rotatably by the motor 40. The eccentric portion 53 may be used as an example of an eccentric shaft provided eccentrically with respect to the rotation shaft to rotate integrally with the rotation shaft.

The rotor core 54 includes a boss portion 55 fixed to a radially outer wall of the rotor shaft 49 by press-fitting for example, and protrusion portions 56 that protrude from the boss portion 55 radially outward. The number of the protrusion portions 56 is eight for example, and the protrusion portions 56 are arranged at regular intervals in a circumferential direction of the rotor core 54. In the rotor core 54, multiple annular plates are stacked in their thickness direction.

The speed reduction portion 60 is a kind of a planetary gear device, and the speed reduction portion 60 includes a ring gear 61 and an external gear 67. The ring gear 61 is located on a radially outer side of the eccentric portion 53 of the rotor shaft 49, and the ring gear 61 is coaxial with the core fixation portion 52 of the rotor shaft 49. The ring gear 61 is press-fitted to a radially inner wall of the plate 82 extending into and held by the cylindrical portion 31 of the front housing 30.

The external gear 67 is located on a radially inner side of the ring gear 61 to engage with the ring gear 61. The external gear 67 is arranged coaxially with the eccentric portion 53 of the rotor shaft 49, and is rotatably supported by a middle bearing 69 fixed to a radially outer wall of the eccentric portion 53.

The external gear 67 has multiple torque-transmission projections 68 that protrude toward an opposite side from the rotor core 54. The torque-transmission projections 68 are arranged at regular intervals in a circumferential direction of the external gear 67. The torque-transmission projections 68 and torque-transmission holes 73 described later function as a rotation transmission portion that transmits rotation of the external gear 67 to the output member 70.

The output member 70 includes a shaft portion 71 and a flange portion 72. The shaft portion 71 is arranged coaxially with the other end portion 51 of the rotor shaft 49, and is rotatably supported by a bush 74. The bush 74 is fixed to a radially inner wall of the output portion 33 of the front housing 30.

The front bearing 58 is provided on a radially inner wall of the shaft portion 71 to be adjacent to the other end portion 51 of the rotor shaft 49. The radially inner wall of the shaft portion 71 has internal teeth extending in an axial direction of the shaft portion 71. The internal teeth are located on an outer side of the front bearing 58 in the axial direction of the shaft portion 71 to engage with an outer member to which power of the rotary actuator 1 is to be transmitted. The internal teeth are capable of connecting the output member 70 and the outer member such that rotary motion can be transmitted therebetween.

The flange portion 72 is connected to an end portion of the shaft portion 71 to be adjacent to the external gear 67. The flange portion 72 has the multiple torque-transmission holes 73 to which the torque-transmission projections 68 of the external gear 67 are freely fitted. The torque-transmission holes 73 are arranged at regular intervals in the circumferential direction of the output member 70. In the first embodiment, at least the eccentric portion 53 of the rotor shaft 49, the external gear 67 and the output member 70 may be used as an example of a rotation output section described later. The output member 70 may be arranged coaxially with the rotation shaft so that the rotation of the external gear 67 is transmitted to the output member 70.

The rotary encoder 77 includes a magnet 78, a Hall IC 79, a non-shown Hall IC and a substrate 80. Hereinafter, when the Hall IC 79 and the non-shown Hall IC are not distinguished from each other, these are described simply as "Hall IC".

The magnet 78 has an annular shape, and is a multipolar magnet that has been magnetized such that north poles and south poles are alternately arranged in its circumferential direction. The magnet 78 is arranged coaxially with the rotor core 54, and is fixed to an end portion of the rotor core 54 on its side adjacent to the bottom portion 23 of the rear housing 21.

The substrate 80 is fixed to the inner wall of the bottom portion 23 of the rear housing 21. The Hall IC is mounted on the substrate 80. The Hall IC 79 is arranged to be displaced from the non-shown Hall IC in the circumferential direction of the magnet 78 by a predetermined angle.

The Hall IC includes a Hall element and a signal conversion circuit. The Hall element is a conversion element that coverts between electricity and magnetism by using the Hall Effect. The Hall element outputs an electric signal that changes in proportion to a magnetic flux density of a magnetic field generated by the magnet 78. The signal conversion circuit converts the output signal of the Hall element to a digital signal. The Hall IC outputs a pulse signal coincident with the rotation of the rotor core 54.

A pulse signal (A phase) outputted from the Hall IC 79 is different from a pulse signal (B phase) output from the non-shown Hall IC by a quarter of a period for example. These two pulse signals are outputted from the signal pin 26 of the connecter portion 24 to, for example, an encoder or an electronic control device having a function of an encoder, so that the two pulse signals are used for detecting a rotation angle and a rotation direction of the rotor core 54.

In the rotary actuator 10 described above, the rotor 48 rotates in one way of its circumferential direction when the energization of the coil 45 is switched in this order, the U-phase coil, the V-phase coil and the W-phase coil. The rotor 48 rotates in the other way of its circumferential direction when the energization of the coil 45 is switched in this order, the W-phase coil, the V-phase coil and the U-phase coil. The rotor 48 rotates by 45° at each cycle of the energization switching of the three kinds of coils.

When the rotor 48 rotates, the external gear 67 rotates on a rotation axis of the eccentric portion 53 of the rotor shaft 49, and moves along inner teeth of the ring gear 61, while the external gear 67 revolve around a rotation axis of the core fixation portion 52. A rotation speed of the external gear 67 is adjusted to be lower than a rotation speed of the rotor shaft 49 by the speed reduction portion 60. When the external gear 67 rotates, the torque-transmission projections 68 and the torque-transmission holes 73 transfer the rotation motion of the external gear 67 to the output member 70. In other words, the rotation output section reduces a rotation speed outputted from the rotor shaft 49 and outputs a power in conjunction with the ring gear 61.

The front housing 30 and the ring gear 61 will be described below. An inner wall of the cylindrical portion 31 of the front housing 30 has six recesses 36 provided at regular intervals in the circumferential direction of the cylindrical portion 31. The recesses 36 are positioned on a radially inner side of the plate 82 as shown in FIG. 1, and are located at positions different from positions of the attachment holes 35 in the circumferential direction of the front housing 30 as shown in FIGS. 2 and 3.

The annular plate 82 held by the cylindrical portion 31 has six recesses 83 located at positions corresponding to the positions of the recesses 36 of the front housing 31 in the circumferential direction. Similarly to the recesses 36 of the front housing 31, the recesses 83 of the plate 82 are different from the attachment holes 35 of the attachment portions 34 in position in the circumferential direction.

Figure 4:
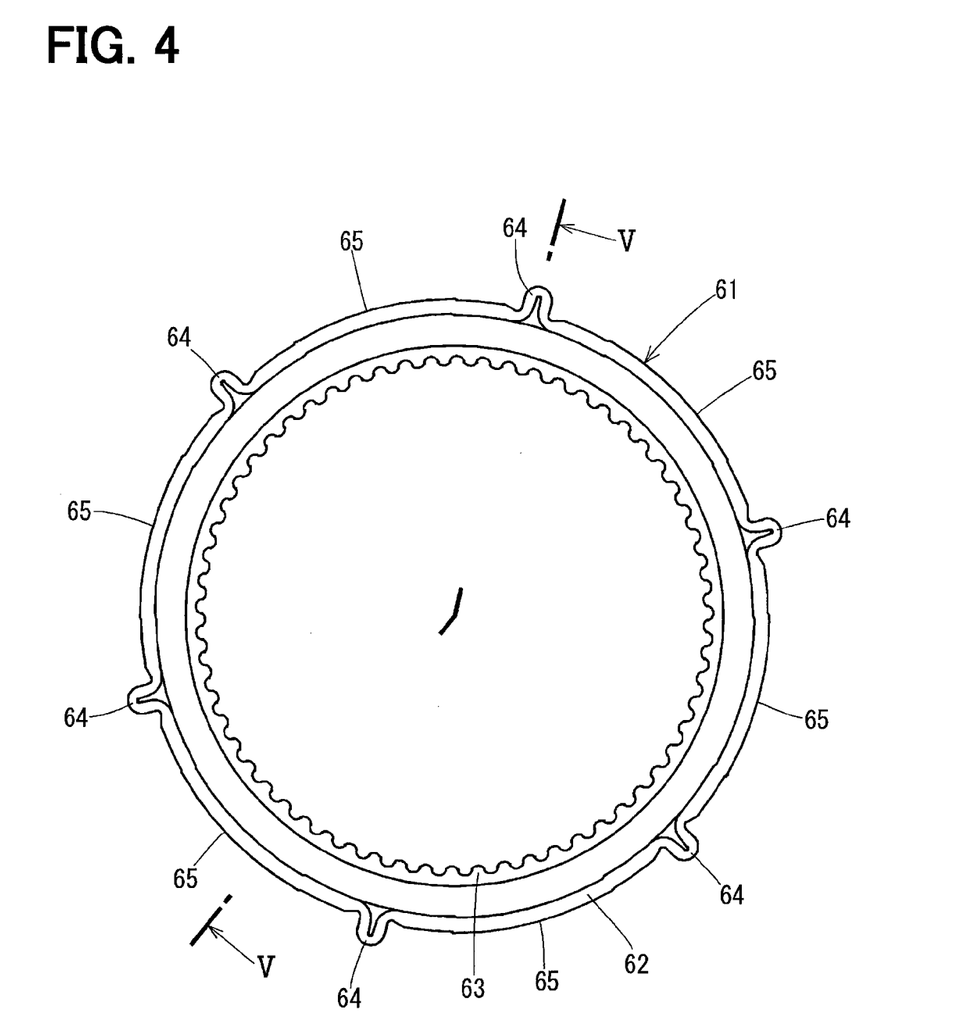
FIG. 4 is a view showing the ring gear shown in FIG. 2.

The ring gear 61 includes a cylindrical portion 62, an inner teeth portion 63 and protrusions 64 as shown in FIGS. 2 and 4. The cylindrical portion 62 has a cylindrical shape, and has six fixation outer surfaces 65 that are provided on a radially outer periphery of the cylindrical portion 62 to be separated from one another in the circumferential direction of the ring gear 61. The fixation outer surfaces 65 are located on an imaginary cylindrical surface drawn by using the shaft center $\phi 1$ as a center. Three of the fixation outer surfaces 65, which are arranged at regular intervals in the circumferential direction, are approximately same as the three attachment portions 34 in position in the circumferential direction.

Figure 5:
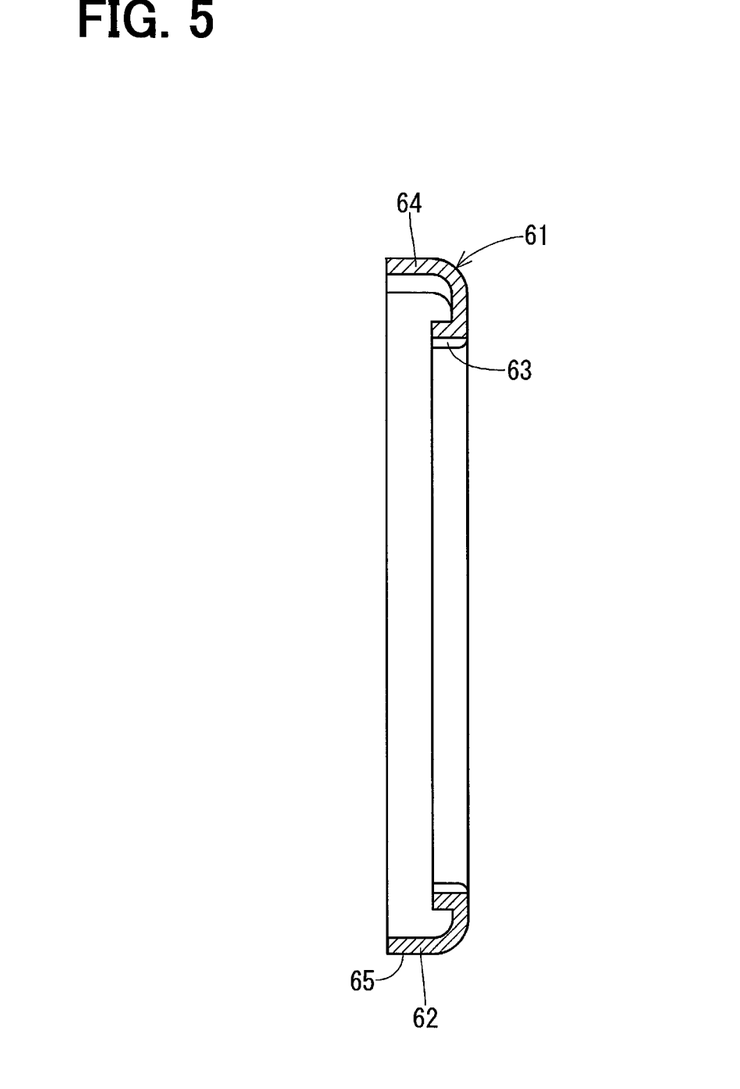
FIG. 5 is a sectional view of the ring gear taken along a line V-V of FIG. 4.

The inner teeth portion 63 extends from an end portion of the cylindrical potion 62 radially inward as shown in FIG. 5, and has multiple internal teeth arranged circularly with respect to the shaft center $\phi 1$ on a radially-inner end part of the inner teeth portion 63. The cylindrical portion 62 and the inner teeth portion 63 of the ring gear 61 may be used as an example of an internal gear. The internal gear is incapable of rotating, and is provided on an outer side of the rotation shaft in a radial direction of the rotation shaft.

As shown in FIGS. 2, 4 and 5, the protrusions 64 are located at positions different from the positions of the fixation outer surfaces 65 in the circumferential direction of the ring gear 61 to be integrated with the cylindrical portion 62. In other words, the protrusions 64 extend from the cylindrical portion 62 radially outward, and are located at regular intervals in the circumferential direction. The number of the protrusions 64 is six. The fixation outer surface 65 of the cylindrical portion 62 of the ring gear 61 is press-fitted to a fixation inner surface 84 of the plate 82 such that the protrusions 64 are inserted into the recesses 36, 83. The protrusions 64 may be integrated with an outer wall of the internal gear. The cylindrical portion 31 and the metallic plate 82 may be used as an example of a housing portion to which the internal gear is fixed. The housing portion may have a cylindrical shape and have the recesses 36 into which the protrusions 64 are inserted. The attachment portions 34 may be used as an example of an attachment member integrated with an outer wall of the housing portion. The attachment member may have the attachment hole 35 that is different from the recess 36 in position in a circumferential direction of the housing portion. The external gear 67 may be supported rotatably by the eccentric shaft, and the external gear 67 engages with the internal gear to revolve around a rotation axis of the rotation shaft with rotating on a rotation axis of the eccentric shaft when the rotation shaft rotates.

As described above, in the rotary actuator 10 of the first embodiment, the positions of the recesses 36 of the cylindrical portion 31 of the front housing 30 are different from the positions of the attachment holes 35 of the attachment portions 34 in the circumferential direction of the front housing 30. In other words, the recesses 36 and the attachment holes 35, both of which can cause stress concentration, are separated from each other in the circumferential direction. Hence, a stress applied on the front housing 30 in the press-fitting of the ring gear 61 can be dispersed in the circumferential direction without focusing on a local part of the front housing 30. As a result, cracking of the front housing 30 due to stress concentration can be restricted, and breakage of the front housing 30 can be limited. The front housing 30 can be made to be robust.

Moreover, because the recesses 36 and the attachment holes 35 are spaced from each other, molding resin is capable of flowing around the recesses 36 and the attachment holes 35 smoothly in a mold in molding of the front housing 30. Consequently, a joint strength of a weld part of the front housing 30 can be increased.

In the first embodiment, the three fixation outer surfaces 65 of the ring gear 61 are arranged at regular intervals in the circumferential direction, and are located at the positions approximately same in the circumferential direction as the positions of the attachment portions 34 having a relatively large thickness. Thus, the ring gear 61 can be deformed uniformly in its circumferential direction in the press-fitting of the ring gear 61 to the front housing 30, and a dimension accuracy of the ring gear 61 can be thereby improved. Therefore, an efficiency and a retaining force of the ring gear 61 can be increased.

In the first embodiment, the metallic insert collar 37 is fixed to the inner wall of the attachment hole 35 of the attachment portion 34. Even in this case, parts of the front housing 30 located on a radially inner side of the insert collars 37 can be thick because the recesses 36 and the attachment holes 35 are spaced from each other in the circumferential direction. Therefore, the breakage of the front housing 30 can be restricted.

In the first embodiment, the three attachment holes 35 are provided at regular intervals in the circumferential direction. Thus, the stress applied to the front housing 30 in the press-fitting of the ring gear 61 to the front housing 30 can be dispersed in the circumferential direction.

(Second Embodiment)

Figure 6:
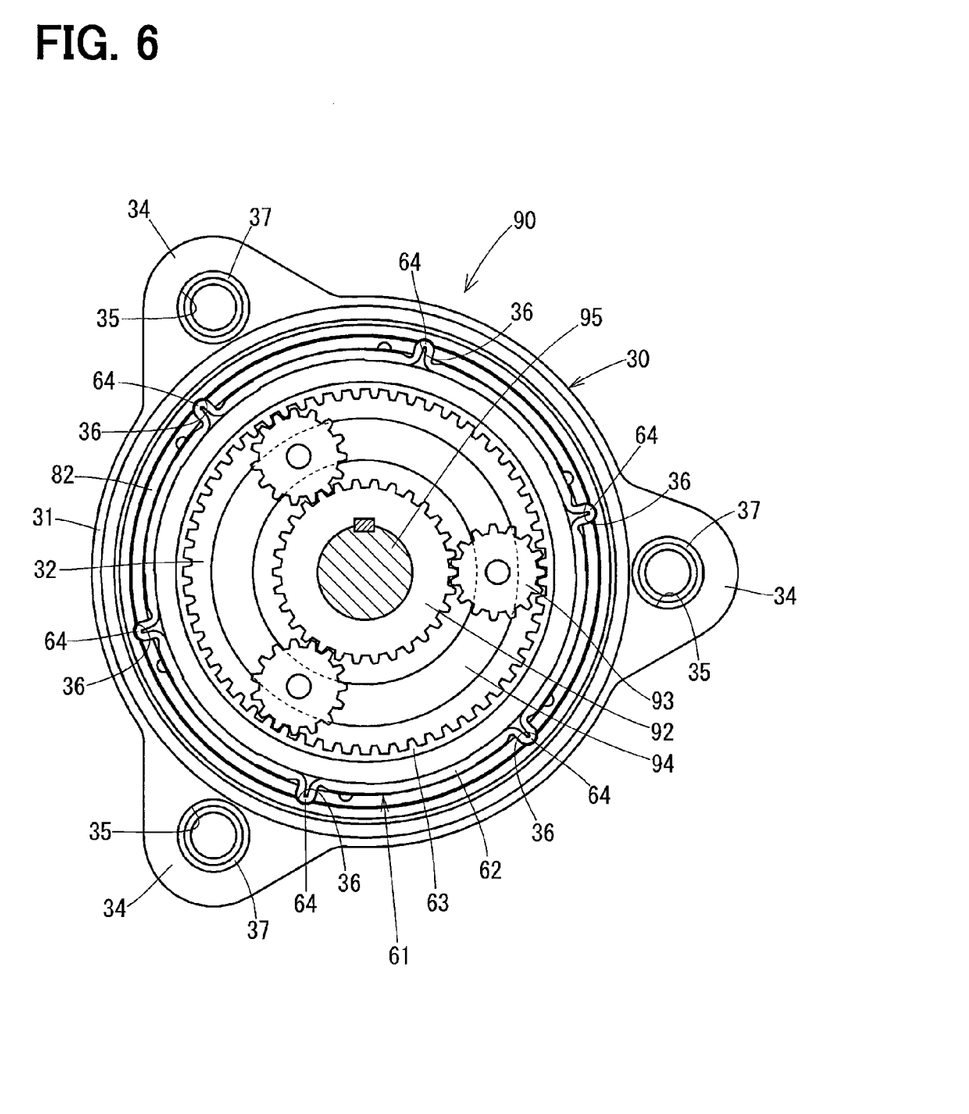
FIG. 6 is a diagram showing a front housing and a ring gear viewed from a rear housing of a rotary actuator according to a second embodiment of the present disclosure.

A rotary actuator 90 according to a second embodiment of the present disclosure will be described referring to FIG. 6. As shown in FIG. 6, a rotation output section the rotary actuator 90 is different from the rotation output section of the rotary actuator 10 of the first embodiment. The rotation output section of the rotary actuator 90 includes a sun gear 92, a planetary gear 93 and a planetary carrier 94.

The sun gear 92 rotates integrally with a rotor shaft 95. The planetary gear 93 engages with a ring gear 61 and the sun gear 92. When the rotor shaft 95 rotates, the planetary gear 93 revolves around a rotation axis of the rotor shaft 95 with rotating. The planetary carrier 94 is coaxial with the rotor shaft 95 to support the planetary gear 93 rotatably. The revolving motion of the planetary gear 93 is transmitted to the planetary carrier 94 so that the planetary carrier 94 rotates. The rotor shaft 95 may be used as an example of the rotation shaft.

The rotation output section of the second embodiment is different from the rotation output section of the first embodiment as described above, but the ring gear 61 and the front housing 30 are same between the first and second embodiments. Thus, similar effects to the first embodiment can be obtained in the second embodiment.

Although the present disclosure has been fully described in connection with the preferred embodiments thereof with reference to the accompanying drawings, it is to be noted that various changes and modifications described below will become apparent to those skilled in the art. The ring gear 61 may be fixed to the inner wall of the front housing 30 by a method other than press-fitting. The plate 82 may not be provided and extend into the cylindrical portion 31 of the front housing 30, and, in this case, the ring gear 61 may be press-fitted to the cylindrical portion 31 of the front housing 30 directly. The insert collars 37 may not be provided and extend into the attachment holes 35 of the attachment portions 34 of the front housing 30.

The front housing 30 may be made of a material other than resin. For example, the front housing 30 may be made of aluminum. The number of protrusions 64 provided integrally with the outer wall of the ring gear 61 is not limited to six, and may be more or less than six. The protrusions 64 may not be arranged at regular intervals in the circumferential direction. The number of recesses 36 of the inner wall of the cylindrical portion 31 of the front housing 30 is not limited to six, and may be more or less than six. The recesses 36 may not be arranged at regular intervals in the circumferential direction.

The number of the attachment holes 35 of the attachment portions 34 of the front housing 30 is not limited to three, and may be more or less than three. The attachment holes 35 may not be arranged at regular intervals in the circumferential direction. The attachment portion 34 of the front housing 30 may be formed in a flange-like shape, and may have multiple attachment holes.

In stead of the planetary gear device including the ring gear 61 and the rotation output section, another planetary gear device including the ring gear 61 may be provided. In the first and second embodiments, the ring gear 61 includes the inner teeth portion 63 extending from the end portion of the cylindrical portion 62 radially inward and having the multiple internal teeth on the radially-inner end part of the inner teeth portion 63. Alternatively, the internal teeth may be integrated with the inner wall of the cylindrical portion 62.

A whole part of the radially outer periphery of the cylindrical portion 62 other than a part where the protrusions 64 are provided may be used as the fixation outer surface 65. The number of the fixation outer surfaces 65 of the ring gear 61 provided between adjacent two protrusions 64 may not be one necessarily. The front housing 30 may be separated into three parts or more in its axial direction.

Instead of the motor 40, another type motor that can function as a power source outputting a torque may be used. The rotary actuator may be used in a device other than a shift-by-wire system of a vehicle. The present disclosure is not limited to the above-described embodiments, and is feasible in various embodiments without departing from the scope of the present disclosure.

Additional advantages and modifications will readily occur to those skilled in the art. The disclosure in its broader terms is therefore not limited to the specific details, representative apparatus, and illustrative examples shown and described.

What is claimed is:

1. A rotary actuator comprising:
   a motor;
   a rotation shaft rotatably driven by the motor;
   an internal gear incapable of rotating, provided on an outer side of the rotation shaft in a radial direction of the rotation shaft;
   a rotation output section provided between the rotation shaft and the internal gear in the radial direction to reduce a rotation speed outputted from the rotation shaft and to output a power in conjunction with the internal gear;
   a housing portion having a cylindrical shape, and fixed to the internal gear located on an inner side of the housing portion in the radial direction; and
   an attachment member integrated with an outer wall of the housing portion, wherein
   the internal gear has a protrusion protruding from an outer wall of the internal gear,
   the housing portion has a recess into which the protrusion is inserted,
   the attachment member has an attachment hole that is different from the recess in position in a circumferential direction of the housing portion,
   the attachment hole is separated from the recess in the circumferential direction, and
   the housing portion does not have a recess that overlaps the attachment hole in the radial direction and into which the protrusion is inserted.

2. The rotary actuator according to claim 1, wherein
   the rotation output section includes:
   an eccentric shaft provided eccentrically with respect to a rotation axis of the rotation shaft, and rotating integrally with the rotation shaft;
   an external gear supported rotatably by the eccentric shaft, the external gear engaging with the internal gear to revolve around the rotation axis of the rotation shaft with rotating on a rotation axis of the eccentric shaft when the rotation shaft rotates; and
   an output member arranged coaxially with the rotation shaft such that the rotation of the external gear is transmitted to the output member.

3. The rotary actuator according to claim 1, wherein
   the rotation output section includes:
   a sun gear which rotates integrally with the rotation shaft;
   a planetary gear engaging with the internal gear and the sun gear to revolve around a rotation axis of the rotation shaft with rotating when the rotation shaft rotates; and
   a planetary carrier arranged coaxially with the rotation shaft, the planetary carrier supporting the planetary gear rotatably such that the revolution of the planetary gear is transmitted to the planetary carrier.

4. The rotary actuator according to claim 1, further comprising a metallic collar fixed to an inner wall of the attachment hole.

5. The rotary actuator according to claim 1, wherein the attachment hole is provided at three positions of the housing portion and arranged at regular intervals in the circumferential direction.

6. The rotary actuator according to claim 5, wherein
   the internal gear has a plurality of protrusions protruding from the outer wall of the internal gear,
   the housing portion has a plurality of recesses into which the plurality of protrusions are inserted respectively, and
   the attachment holes are different from the plurality of recesses in position in the circumferential direction of the housing portion.

* * * * *